US012645404B2

(12) United States Patent
Ben Dayan et al.

(10) Patent No.: US 12,645,404 B2
(45) Date of Patent: *Jun. 2, 2026

(54) TIERING DATA STRATEGY FOR A DISTRIBUTED STORAGE SYSTEM

(71) Applicant: Weka.IO Ltd., Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: WEKA.IO Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/814,942

(22) Filed: Aug. 26, 2024

(65) Prior Publication Data

US 2024/0419364 A1 Dec. 19, 2024

Related U.S. Application Data

(63) Continuation of application No. 18/134,216, filed on Apr. 13, 2023, now Pat. No. 12,086,471, which is a continuation of application No. 17/342,185, filed on Jun. 8, 2021, now Pat. No. 11,656,803, which is a continuation of application No. 16/122,524, filed on Sep. 5, 2018, now Pat. No. 11,061,622.

(60) Provisional application No. 62/585,204, filed on Nov. 13, 2017.

(51) Int. Cl.
*G06F 3/06* (2006.01)

(52) U.S. Cl.
CPC .......... *G06F 3/0662* (2013.01); *G06F 3/0604* (2013.01); *G06F 3/064* (2013.01); *G06F 3/0649* (2013.01); *G06F 3/067* (2013.01); *G06F 3/0652* (2013.01)

(58) Field of Classification Search
CPC ...... G06F 3/0662; G06F 3/0604; G06F 3/064; G06F 3/0649; G06F 3/067; G06F 3/0652; G06F 3/0685; G06F 3/061; G06F 3/0656
USPC ......................................................... 711/154
See application file for complete search history.

(56) References Cited

U.S. PATENT DOCUMENTS

| | | | |
|---|---|---|---|
| 6,487,636 | B1 | 11/2002 | Dolphin et al. |
| 7,447,839 | B2 | 11/2008 | Uppala |
| 7,681,072 | B1 | 3/2010 | Gibson et al. |
| 7,793,146 | B1 | 9/2010 | Gibson et al. |
| 7,877,511 | B1 | 1/2011 | Berger et al. |

(Continued)

FOREIGN PATENT DOCUMENTS

| | | |
|---|---|---|
| CN | 101131673 | 2/2008 |
| CN | 101859283 | 10/2010 |

(Continued)

OTHER PUBLICATIONS

Int'l Search Report and Written Opinion Appln No. PCT/IB2016/001177 dated Dec. 2, 2016.

(Continued)

*Primary Examiner* — Hua J Song
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. The storage devices may be assigned to one of a plurality of memory tiers, and the data in a storage device may be reassigned to another storage device in a different memory tier.

20 Claims, 7 Drawing Sheets

(56) References Cited

U.S. PATENT DOCUMENTS

| | | |
|---|---|---|
| 8,315,995 B1 | 11/2012 | Levy |
| 8,347,010 B1 | 1/2013 | Radovanovic |
| 8,370,597 B1 | 2/2013 | Chatterjee et al. |
| 8,645,749 B2 | 2/2014 | Reche |
| 8,918,478 B2 | 12/2014 | Ozzie et al. |
| 9,087,012 B1 | 7/2015 | Hayes et al. |
| 9,448,887 B1 | 9/2016 | Ben Dayan et al. |
| 9,519,438 B1 | 12/2016 | Paresh et al. |
| 9,747,162 B2 | 8/2017 | Ben Dayan et al. |
| 11,061,622 B2 | 7/2021 | Ben Dayan et al. |
| 2003/0115218 A1 | 6/2003 | Bobbitt et al. |
| 2004/0098415 A1 | 5/2004 | Bone et al. |
| 2005/0289152 A1 | 12/2005 | Earl et al. |
| 2007/0061542 A1 | 3/2007 | Uppala |
| 2007/0143261 A1 | 6/2007 | Uppala |
| 2007/0143311 A1 | 6/2007 | Uppala |
| 2007/0276878 A1 | 11/2007 | Zheng et al. |
| 2009/0119541 A1 | 5/2009 | Inoue et al. |
| 2010/0199125 A1 | 8/2010 | Reche |
| 2011/0213994 A1 | 9/2011 | Thereska et al. |
| 2011/0289271 A1 | 11/2011 | Nagpal et al. |
| 2012/0210095 A1 | 8/2012 | Nellans et al. |
| 2014/0244897 A1 | 8/2014 | Goss et al. |
| 2014/0281280 A1 | 9/2014 | Goss et al. |
| 2015/0248366 A1 | 9/2015 | Bergsten et al. |
| 2015/0254088 A1 | 9/2015 | Chou et al. |
| 2015/0338893 A1 | 11/2015 | Park et al. |
| 2015/0355971 A1 | 12/2015 | Becker-Szendy et al. |
| 2016/0246677 A1 | 8/2016 | Sangamkar et al. |
| 2016/0371145 A1 | 12/2016 | Akutsu et al. |

FOREIGN PATENT DOCUMENTS

| | | |
|---|---|---|
| CN | 103605483 | 2/2014 |
| CN | 103984648 | 8/2014 |
| CN | 104166631 | 11/2014 |
| CN | 104317731 | 1/2015 |

OTHER PUBLICATIONS

Int'l Preliminary Report on Patentability Appln No. PCT/IB2016/001177 dated Mar. 8, 2018.

Int'l Search Report and Written Opinion Appln No. PCT/IB2016/000996 dated Oct. 20, 2016.

Int'l Preliminary Report on Patentability Appln No. PCT/IB2016/000996 dated Jan. 2, 2018.

Extended European Search Report Appln No. 16817312.8-1217 dated Oct. 25, 2018.

Int'l Search Report and Written Opinion Appln No. PCT/IB2018/001280 mailed Mar. 22, 2019.

Int'l Preliminary Report on Patentability Appln No. PCT/IB2018/001280 mailed May 28, 2020.

European Office Communication with with extended search report Appln No. 18876922.8 dated Jul. 22, 2021.

Chinese Office Action Appl No. 2018800864113 dated Mar. 9, 2023.

Chinese Office Action Appl No. 2018800864113 dated Aug. 28, 2023.

500

| Label | State |
|-------|-------|
| 000 | local0 |
| 001 | local1 |
| 010 | local2 |
| 011 | retention0 |
| 100 | retention1 |
| 101 | retention2 |
| 110 | local |
| 111 | not local |

FIG. 5

TIERING DATA STRATEGY FOR A DISTRIBUTED STORAGE SYSTEM

PRIORITY CLAIM

This application is a continuation of U.S. application Ser. No. 18/134,216 filed on Apr. 13, 2023, which is a continuation of U.S. application Ser. No. 17/342,185 filed on Jun. 8, 2021, now U.S. Pat. No. 11,656,803, which is a continuation of U.S. application Ser. No. 16/122,524 filed on Sep. 5, 2018, now U.S. Pat. No. 11,061,622, which claims priority to U.S. provisional patent application 62/585,204, filed on Nov. 13, 2017. Each of the above-referenced applications is hereby incorporated herein by reference in its entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for tiering data strategy in a distributed storage system substantially as illustrated by and/or described in connection with at least one of the figures, as set forth more completely in the claims.

BRIEF DESCRIPTION OF THE DRAWINGS

FIG. 5 is an example table illustrating states of an extent in accordance with an example implementation of this disclosure.

Referring to FIG. 6, there is shown the flow diagram

DETAILED DESCRIPTION

Traditionally, filesystems use a centralized control over the metadata structure (e.g., directories, files, attributes, file contents). If a local filesystem is accessible from a single server and that server fails, the filesystem's data may be lost if as there is no further protection. To add protection, some filesystems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory such as, for example, RAM, for fast access, and may be backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
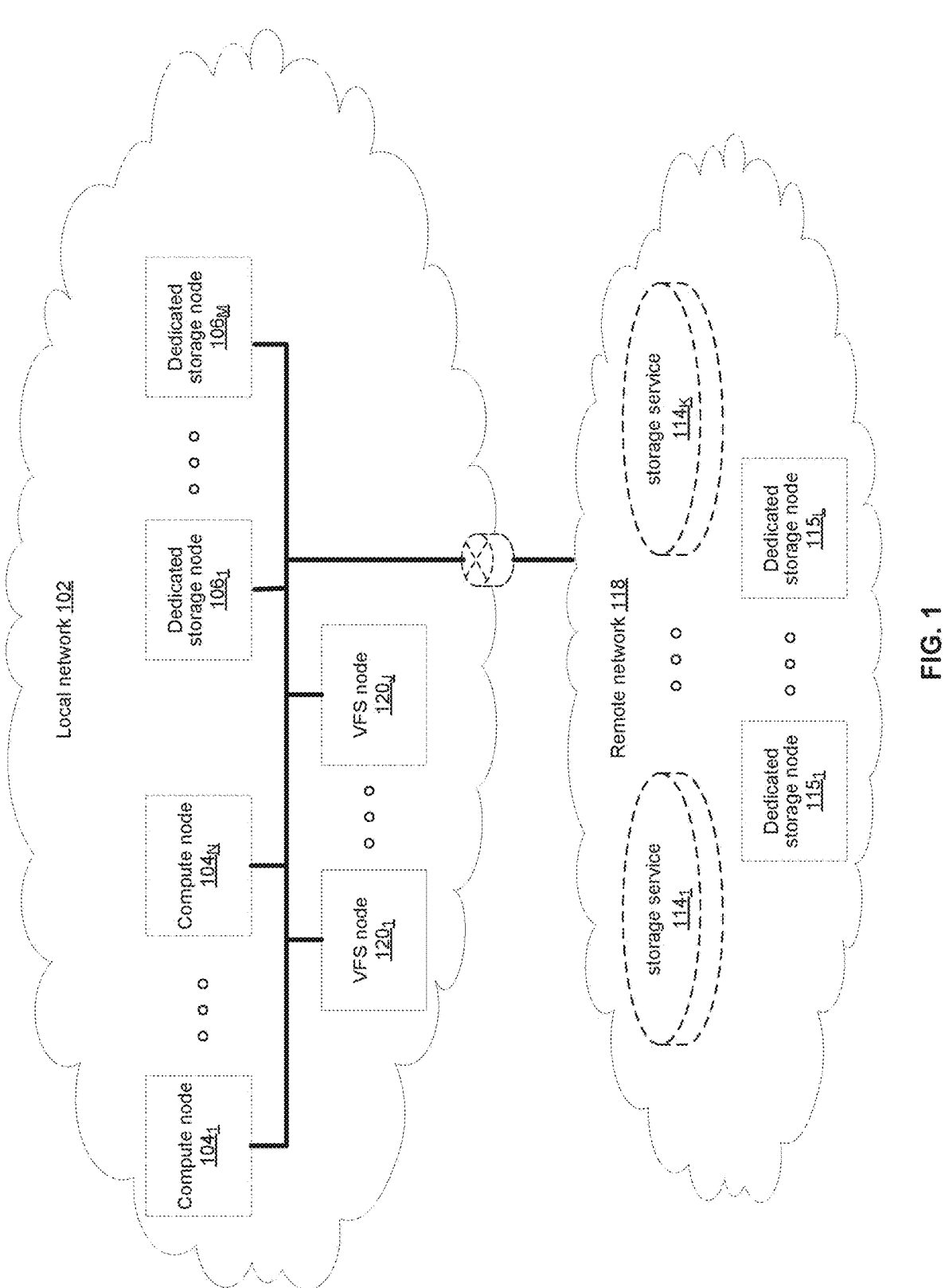
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each VFS node $120_j$ (j an integer, where $1 \le j \le J$) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
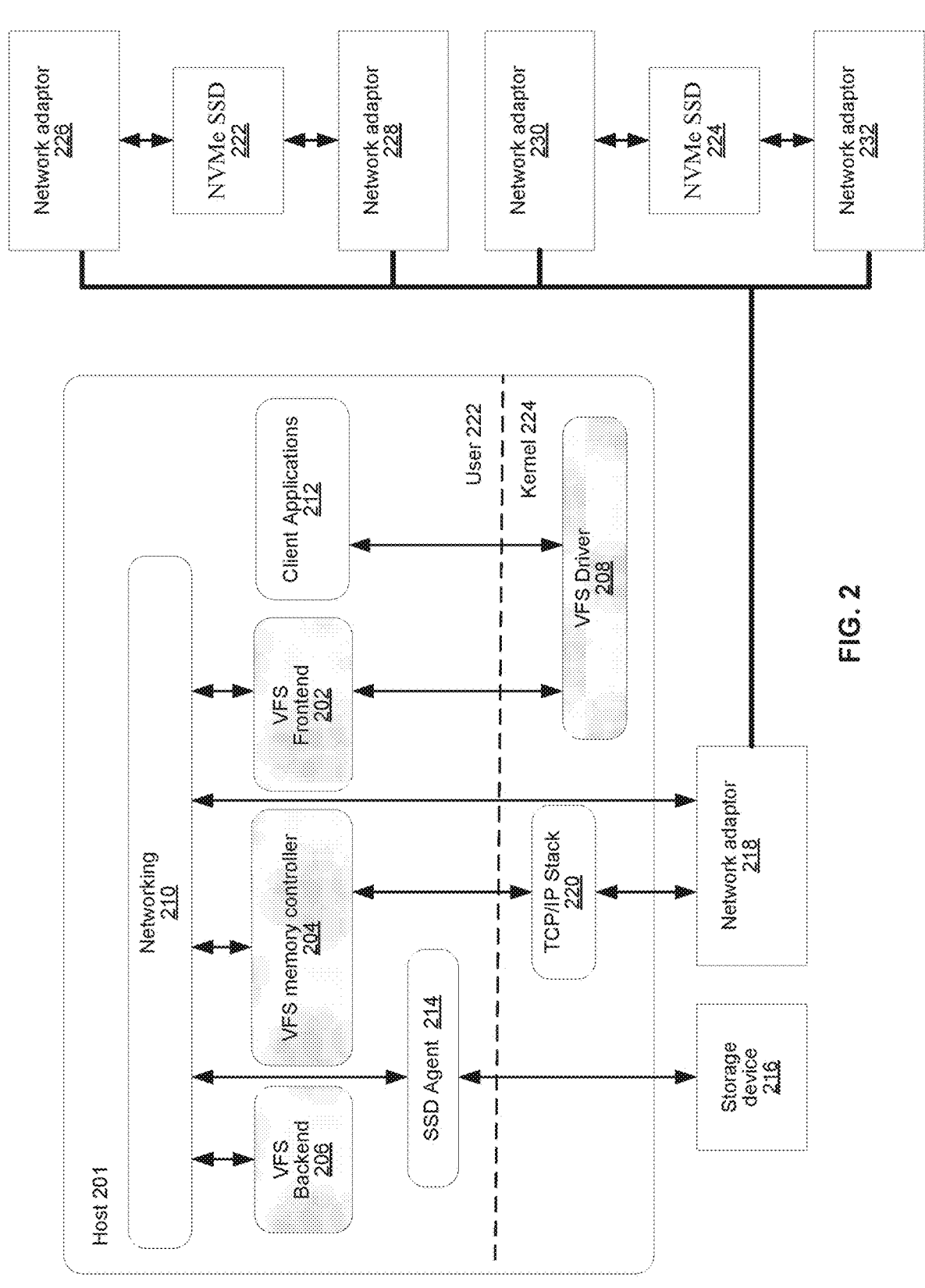
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for unix (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-oF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
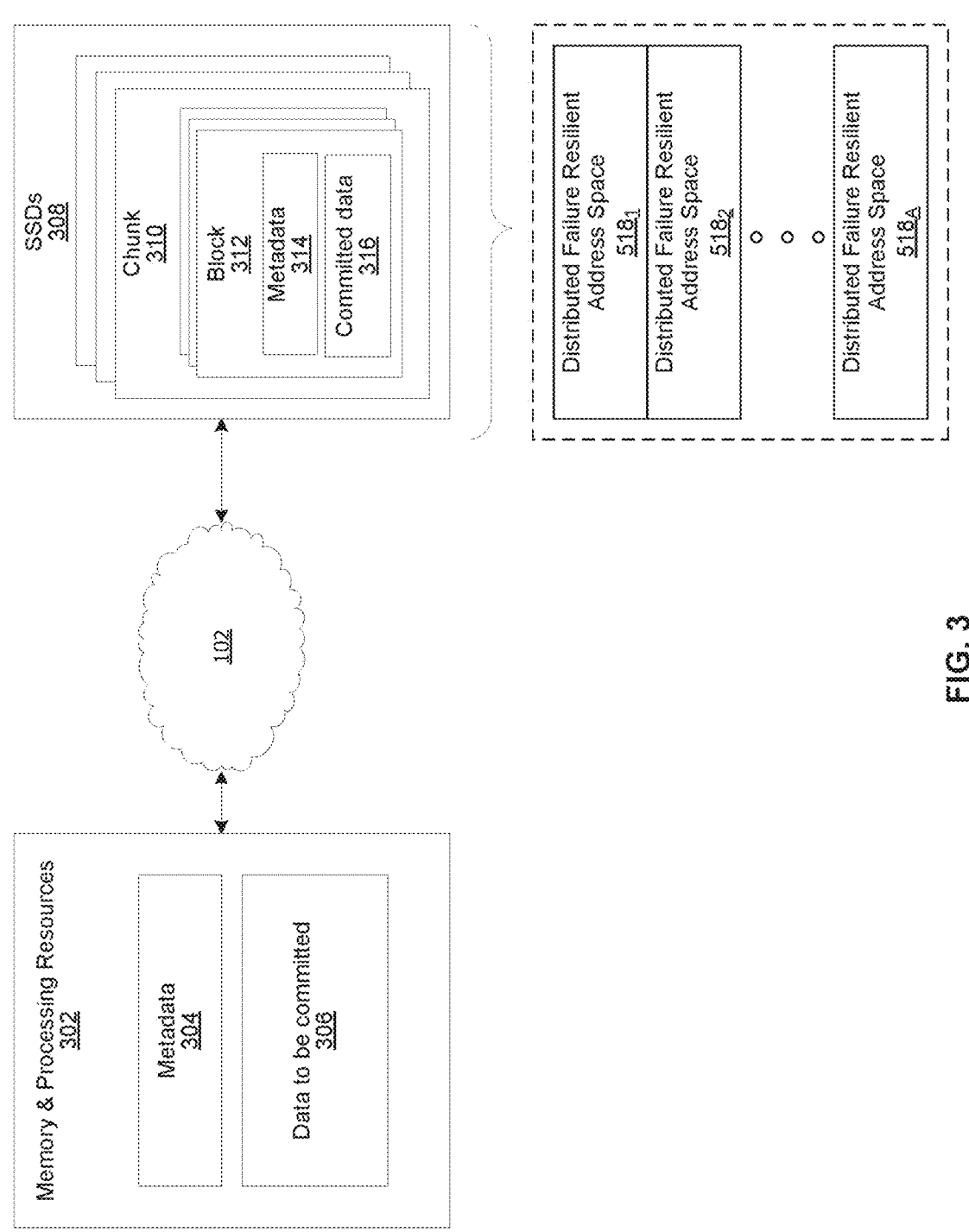
FIG. 3 illustrates another representation of a virtual file system in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 518. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_j$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re] assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000

$$\left(\frac{26!}{5!*(26-5)!}\right)$$

possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Because each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes, and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

Additionally, various embodiments of the disclosure may also have a method for classifying files to one of a plurality of tiers, or "tiering." This method may determine changing where the file is stored, whether the file should be cached, and/or whether the file should be pre-fetched. Tiering may depend on various metadata for the file such as, for example, time of last modification or access, location, extension, size, etc., and/or user-defined policies such as, for example, per-directory, per-file, per-appliance, etc.

Various embodiments of the disclosure may have "local" SSD storage that may be directly connected to a server and a lower-tier "object storage" may be, for example, non-SSD storage. Other embodiments may have more than 2 tiers. Generally, various embodiments may have different speeds of memory in the different tiers and/or memory in the lower tiers may have larger latency from being farther from the server that is controlling access to the memory in the various tiers.

Figure 4:
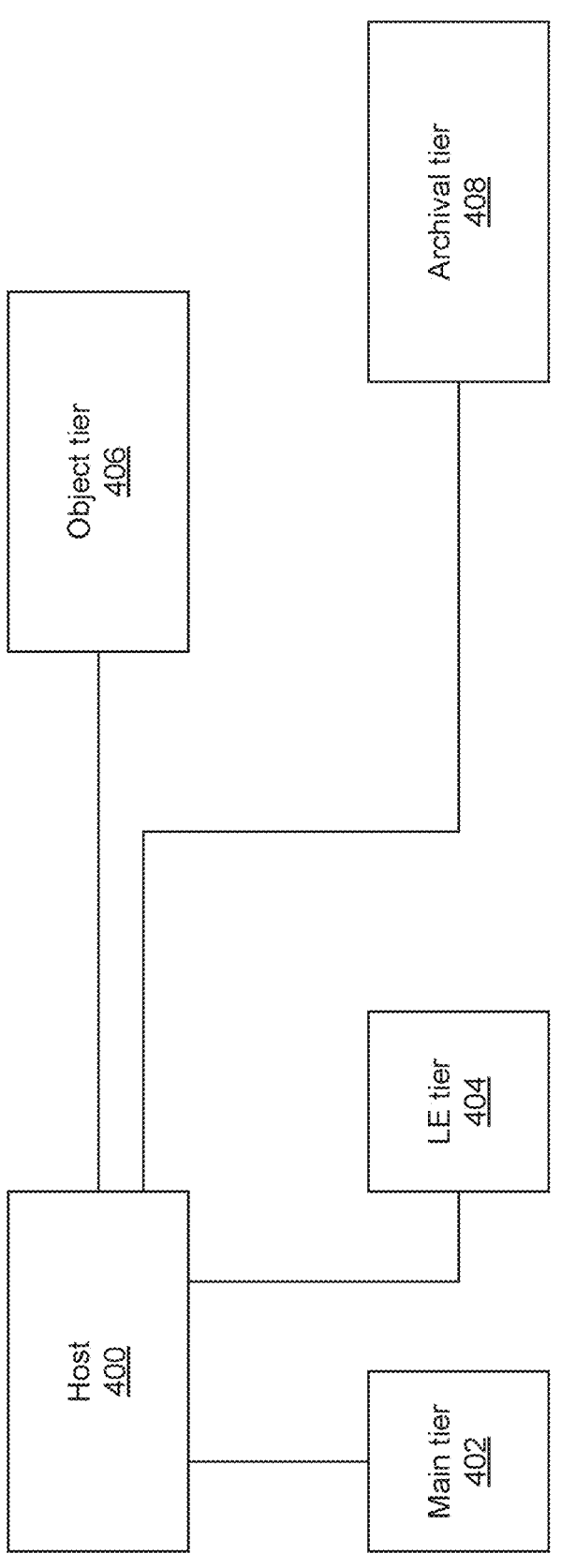
FIG. 4 illustrates an example of tiered memory in accordance with an example implementation of this disclosure.

FIG. 4 illustrates an example of tiered memory in accordance with an example implementation of this disclosure. Referring to FIG. 4, there is shown a host 400 that may communicate with various tiers of memory. For example, a given memory may belong to one of 4 tiers 402, 404, 406, and 408.

Memory in the main tier 402 may have the highest performance non-volatile memory (NVM) among the four tiers of memory. The main tier 402 may not be tied to a specific type of NVM. Rather, various types of NVM may be supported. For example, while Flash memory may be used at present, other types of technology such as, for example, FeRAM may be used as they are made available. The main tier 402 may be local or a network attached storage (NAS) with low latency supporting, for example, Ethernet, RDMA, NVM express over fabrics, etc.

The next tier below the main tier may be low endurance tier 404. This tier may use NVM that may be cheaper than the main tier NVM, and, accordingly, have slower access times. This tier may be configured similarly as the main tier either locally with a direct connection or as an NAS.

The next tier below the low endurance tier 404 may be object storage tier 406. The object storage tier 406 may also be local or an NAS, with an internal bus such as, for example, PCIE, SAS, or SATA, and circuitry that allows the NVM to be accessed in a network much as the main tier NVM. Some object storage tier 406 may use, for example, magnetic technology, but any suitable technology may be used.

The next lower tier may be referred to as archival tier 408. This tier may be for data that is rarely accessed. For example, the data may be required for regulatory reasons where an entity is required by law or regulation to keep data for a certain amount of time. Accordingly, the archive tier 408 memory may be located in remote locations, and taking hours or days to access the data may be acceptable. For example, the archival tier 408 memory may be cloud based, or tape backup stored in a building, etc.

The main tier 402 may hold all metadata. The main tier 402 may also be used for two types of caching. There may be a read cache for magnetic storage in the lower tier(s) since magnetic media may have high latency when reading data. Accordingly, pre-fetch algorithms may determine which files are being read and use various heuristics to perform pre-fetching and other techniques to make sure that future reads for the same kind of data are going to be very fast. The main tier 402 may also use a write cache for the write data to avoid write amplification to NVM, optimize network throughput, and/or reduce latency.

Various embodiments of the disclosure may allow memory management for the main tier 402 and one or more of the low endurance tier 404, the object storage tier 406, and the archival tier 408. Part of memory management may include, for example, assigning a state to the data in one or more of the tiers.

FIG. 5 is an example table illustrating states of an extent in accordance with an example implementation of this disclosure. Referring to FIG. 5, there is shown a table 500 with 8 rows, where each row is a possible state of an extent. The 8 possible states may be identified by a 3-bit label, which may be referred to as a "tag."

States of each extent in the various tiers of memory may be kept in a "tag" in a registry, where the registry is a data structure that holds the metadata for all files. Each entry in the registry may refer to an extent, and the tag may be a part of an entry. Accordingly, a tag may refer to an extent of data. The registry may be stored in RAM for fast access.

The tags may refer to, for example, 3 states for deciding when to demote the tier of the file, 3 states for deciding when to delete the read cache, and whether the extent is all on SSD ("local") or not. These 8 states may be represented by a 3-bit tag. The demote states may be labeled as, for example, local0, local1, local2, and the delete read cache may be labeled as, for example, retention0, retention1, retention2. When an extent is at local2 state, that extent may be a candidate for demotion to a lower tier storage. Similarly, when an extent is at local2, that extent may be a candidate for having its data removed from a read cache.

A demotion period may be a period of time the system waits for a write to an extent before the extent can be demoted (destaged) to the object storage. This may be related to the rate of update a file goes through, where if it has not been modified for at least a demotion period, it may be assumed it probably won't be modified in the near future. The demotion period may be counted by an appropriate hardware circuit with an appropriate clocking signal.

A retention period may be how long a file is kept in the read cache before deleting it if there is no read of that file. Accordingly, this is related to how often data is read from the file. After the retention period passes without being read, it may be assumed that the extent probably won't be read in the near future. The retention period may be counted by an appropriate hardware circuit with an appropriate clocking signal. If the extent is read, then the extent (or a portion of it) will be fetched again from the object storage and stored again in the read cache.

Backpressure is related to the amount of free space a bucket has. If a bucket has too little free space to allow new writes, it calls the backpressure mechanism of the object storage so the object storage may free data. First freed data may be the read cache blocks that are past the time to preserve, then extents may be demoted based on the date/time they were last touched.

Figure 6:
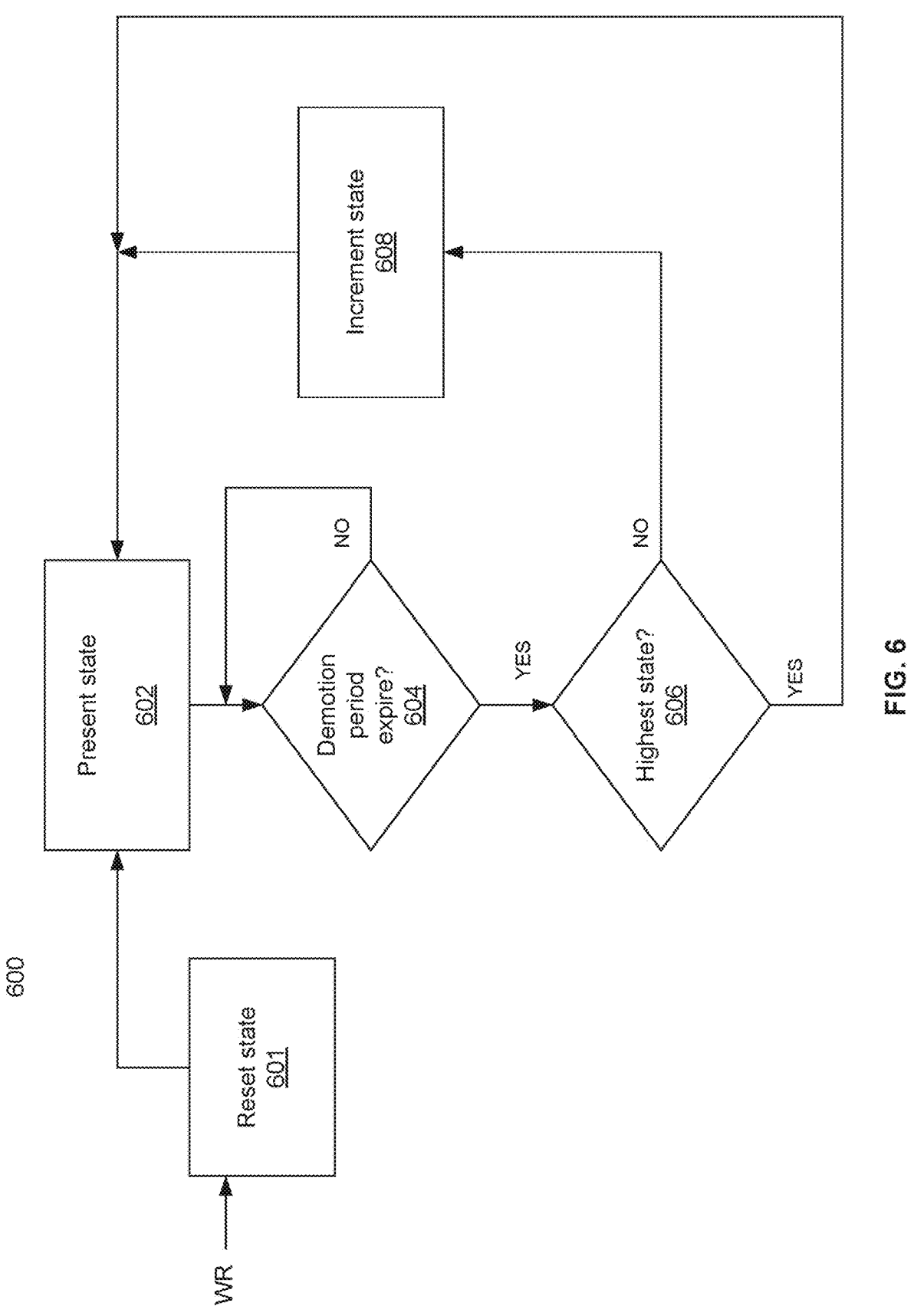
FIG. 6 is an example flow diagram illustrating demotion of an extent or deletion of a read cache entry in accordance with an example implementation of this disclosure.

FIG. 6 is an example flow diagram illustrating demotion of a block of memory in accordance with an example implementation of this disclosure. Referring to FIG. 6, there is shown the flow diagram 600 where a 4 K block in an extent may be at a present state 602. With respect to demotion, the lowest state may be local0, then the next higher state may be local1, and the highest state may be local2. At 601, whenever there is a write to a 4 KB block, that block's state for demotion may be reset to the lowest state.

At 604, a check may be made to see if a demotion period expired without a write to an extent. If not, the timer may be checked later by returning to 604. If so, the state may be checked at 606 to see if the demotion state is at the highest state local2. If so, then there is no need to increment the demotion state to a higher state. If not, the demotion state is incremented at 608 before returning to present state 602. For example, local0 state is incremented to local1 state, or local1 state is incremented to local2 state.

A block at a local2 state indicates that it was not updated for at least one demotion period and possibly for two demotion periods, so it may be demoted to the object storage.

A similar process may be followed for deleting a block in a read cache.

Figure 7:
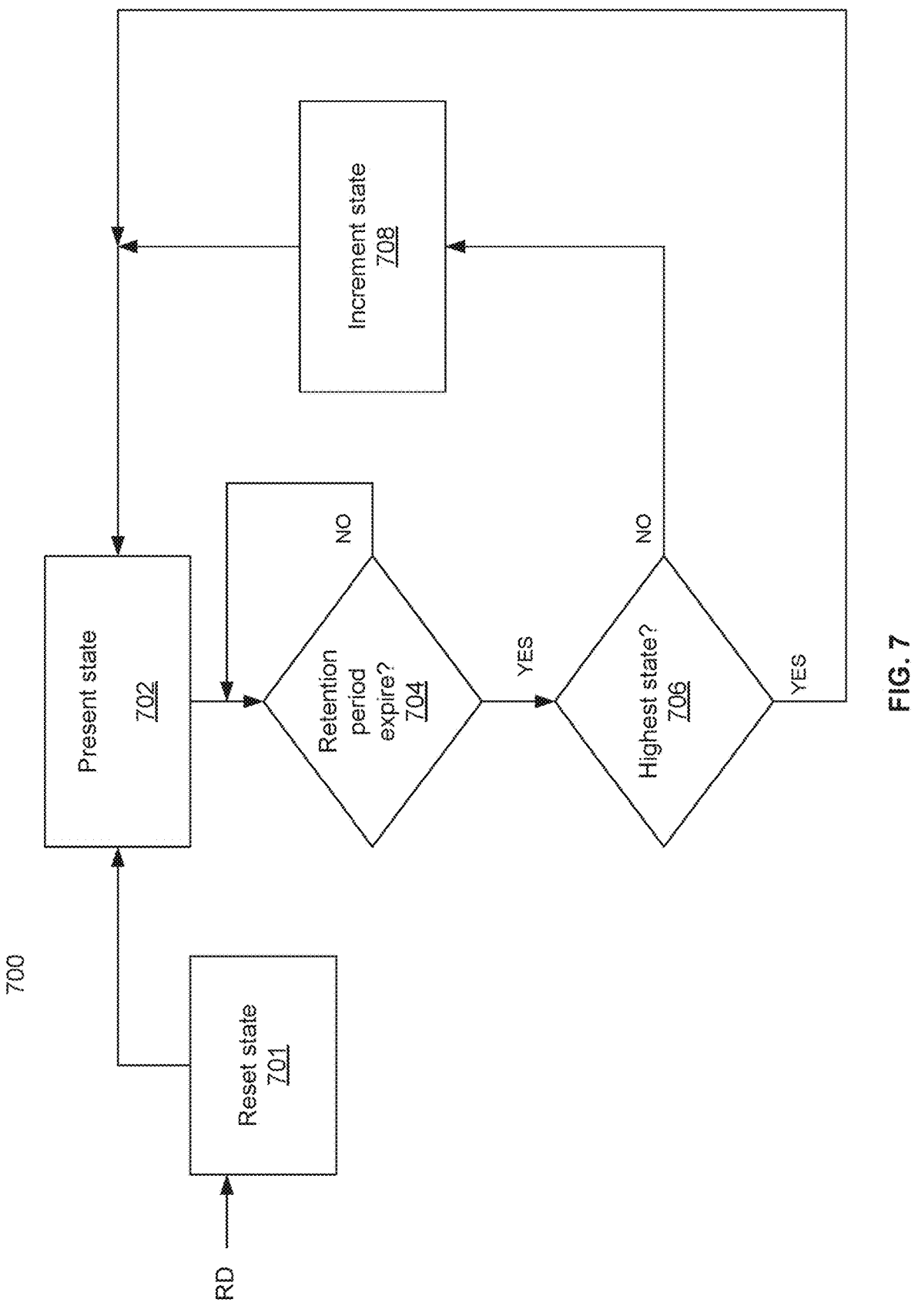
FIG. 7 is an example flow diagram illustrating deletion of an extent in a read cache in accordance with an example implementation of this disclosure.

FIG. 7 is an example flow diagram illustrating deletion of a memory block in a read cache in accordance with an example implementation of this disclosure. Referring to FIG. 7, there is shown the flow diagram 700 where a 4 K block in an extent may be at a present state 702. With respect to deleting a read cache entry, the lowest state may be retention0, then the next higher state may be retention1, and the highest state may be retention2. At 701, whenever there is a read from a 4 KB block, that block's state for deleting the read cache entry may be reset to the lowest state.

At 704, a check may be made to see if a demotion period expires without accessing a block. If not, a check may be later by returning to 704. If so, a check may be made at 706 to see if the deletion state is at the highest state retention2. If so, then there is no need to increment the deletion state to a higher state. If not, the deletion state is incremented at 708 before returning to present state 702. For example, retention0 state is incremented to retention1 state, or retention1 state is incremented to retention2 state.

The retention period and the demotion period may be different or they may be the same. Each of the retention period and the demotion period may be dynamically changed depending on, for example, the number of memory accesses, the rate of memory accesses in the existing retention and demotion periods, and/or other parameters that may be tracked by a memory management system.

A block at a retention2 state indicates that it was not read for at least one retention period and possibly for two retention periods, so it may be deleted from the read cache.

Since the registry may be in a fast memory device such as, for example, RAM, the registry may be quickly reviewed for the state of the blocks. Accordingly, looking for blocks that need to be moved to a lower tier storage (destaged) or blocks of cached data that can be safely removed from a read cache may be done very efficiently without a need to do reads and/or writes to data structures on the slower memories.

Generally, data may be in a "local" state when the data is stored on SSD. "Read cache" data are data stored in the object storage and also cached in SSD for performance. An "object" data may be data in object storage and not cached in SSD. The state may not be for the extent, but for each one of the 256 4 k blocks that are in the extent, as the data can be overwritten.

As an example of different blocks in an extent being overwritten, a "local" extent may be demoted to object storage. The state for the extent (all the data blocks in the extent) may then change from "local" to "read cache" since the local copy is still available. If some 4 k blocks of the extent are modified, then these 4 k blocks are in "local" state again. If, due to backpressure or server failure, some read cache blocks are not on the system anymore, these blocks' states are changed to "object." Accordingly, a single extent may have different blocks in different states.

With regard to object storage, the object name on the object storage system may be derived from the extent ID, but also may have a version ID in the name. The version ID may be needed for two reasons. First, the extent may be demoted several times (as it can be overwritten), so there may be several versions of an extent, especially if snapshots are also implemented.

Second, when an object storage system is consistent, and if two PUTs (writes) of the same object to the object storage are called in short order, the first PUT may be the one that is actually saved rather than the first PUT followed by the second PUT. If the order of the PUTs is not preserved, there may be instances when the data for the first PUT is saved and the second PUT does not happen.

As an example, if a demote happens with a first PUT, and some more writes are made to the same extent, and then the server failed before the first PUT was acknowledged, then the new server may have the writes already accounted for. However, since the PUT for the demote has not been acknowledged, it may be this PUT that "holds." Accordingly, the file system will get out of sync with the object storage as the file system assumes the later PUT was accepted with the changed blocks. However, if an index is incremented after each PUT, this may not happen. The first PUT will increment the counter, which will be journaled, and after the failover the next PUT will happen as there is no knowledge that the first PUT was successful, but with a different index, so at worst the file system may "waste" an object, but won't lose data integrity.

This may allow the file system to effectively manage a very large amount of data, but keep all the relevant metadata in RAM and make the selection of what extents to PUT very simple. When the backpressure mechanism starts, it may also allow the system to identify very efficiently what blocks would make good candidates for demotions or deletions of the read cache.

As opposed to a block based system that has a file system layered over it, various embodiments of the disclosure may be able to perform efficient prefetching since the file system manages the files, and, hence, knows where the files are stored. However, a file system that operates independently of the block system may not be able to correlate the block locations to the file. And if one block has to be retrieved from a lower performance media, the block system may not know where the next read pre-fetch would happen as the file system manages the placement of data, but the block system usually manages the prefetch of data independently of the file system.

Various embodiments of the disclosure may also demote or delete an entire extent depending on, for example, how many blocks in the extent may be ready to be demoted or deleted from the read cache.

In various embodiments of the disclosure, an extent may notify other extents that it read data from the object storage so that these extents can prefetch the data from the object storage if they choose to. For example, an extent may notify the next 5 extents. Once an extent receives notifications that reads happened from closer and closer extents, it may decide to notify extents further away so more data can be read in parallel.

Various embodiments of the disclosure may provide other management mechanisms. For example, specific files or portions of the files may be marked as "pinned" so that these files are always stored on SSD and not demoted. Specific files or portion of the files may be marked as "always read cached" so that even if they are demoted, there will be a read cache copy of these files. If there is a node failure, then the files may be immediately re-fetched from the object storage upon recovery of the node.

A CLI (command) may be provided to re-fetch (hydrate) a list of files, to demote a list of files to the object storage, or to clear the read cache of a list of files from the SSD to free up SSD space. Each file in the list of files may be the entire file or a portion of the file.

Various embodiments of the disclosure may support various backends for object storage, including backend store services. However, it may be noted that some backend store services may have buckets that are very limited. For example, some backend store services may allow only about 1 M objects per bucket. SWIFT storage system may be one such backend store service, among others. However, since various embodiments of the disclosure may support many more extents than 1 M extents, the 1 M object limitation may be too small for some purposes.

Accordingly, to get around the number of objects per bucket limitation, a large number of buckets may be created. For example, creating 1 M buckets may allow support of $10^{12}$ objects. And creating more buckets will allow support of even more objects.

The file system may then use the hash of an object to choose the bucket. The first few bits of the hash of the key may be used to decide which bucket is going to be used for that object.

If one of the buckets gets full, a first option may be to start over with a new list of buckets while still remembering the old list of buckets. The index of the bucket configuration may then be stored in an extent to effectively get a new configuration. This representation may allow the extent to keep the counter of the buckets configuration, and has the advantage that no data movement is needed.

A second option may be to ask the user to double the number of buckets, and add one more bit to the "shard." New objects may be written according to the bigger size of buckets, and there may be an ongoing process of migrating objects to their new buckets based on checking the extra added bit. As long as the background process is still working the file system will first try to GET (read) an object by its final location with the extra bit, and, if not present, try reading it from the old bucket. This may have the advantage that the file system works with a single backend configuration for that filesystem, but has the disadvantage that it will have to do data movements between buckets each time the number of buckets is doubled.

A very large namespace that may span more than a single object storage may also scale. For example, ten object storage systems of 50 PB may be aggregated to support a ½Exabyte system. This aggregation may be used with, for example, the first option of storing a key in the extents indicating to what backend object it was actually mapped to.

One method may be to have a 1:1 mapping between the extents and the objects. But some backend object storages may not handle small objects very well where a 1 MB file may still be considered small.

Various embodiments of the system may allow a configuration of optimal object sizes of, for example, 4 MB-32 MB to promote higher throughput by the object storage system. These sizes will be in multiples of extent sizes, where an extent may be 1 MB.

The file system may then use the new size as the object size when doing destaging and also retrieval. The objects may all be aligned to that requested size, so if the object size is 10 MB then all the objects may start at an offset that is 10 MB aligned.

The first extent that is aligned may be referred to as the "controller" for that object, and the bucket that holds that extent may gather all the data of all the extents, including from other buckets and possibly from other nodes, and write that data.

If a registry scan for one of the extents that is not the controller decides that a destage may be needed, it will send an RPC to the controller to initiate the destage. Similarly, if data is needed from the object storage, it may be read through the controller extent and distributed to the rest of the buckets.

Various embodiments of the disclosure have much more internal throughput than the object storage system, so some of the embodiment resources to may be used so that the object storage solution may provide some more overall throughput performance.

The file system may decide how extents are distributed between the buckets when configured initially. If the file system determines early on that an object storage that requires bigger objects is leveraged, then adjacent extents may be grouped at the same bucket so there will be less network traffic that is related to aggregating extents into a single object.

As disclosed, an embodiment of the disclosure may comprise a plurality of storage devices, where each of the plurality of storage devices may be assigned to an upper tier or a lower tier. Each storage device may be operable to store one or more data blocks, and each of the data blocks may be associated with a state. A processor may be configured to read a current state associated with a particular data block, and depending on the current state, perform one of: demotion of each of the particular data block to a second storage device in the lower tier; and deletion of each of the particular data block from a read cache.

There may be a plurality of demotion states, and the system may comprise appropriate circuitry to count a demotion period. When the counting of the demotion period is finished, each data block that is not at a highest demotion state may be incremented to the next higher demotion state. If a write access is made to any of the data blocks, then those data blocks are reset to a lowest demotion state. Any data block at the highest demotion state may be demoted to the next lower tier.

A data block may be, for example, 4 kilobytes.

There may be a plurality of deletion states, and the system may comprise appropriate circuitry to count a retention period. When the counting of the retention period is finished, each data block that is not at a highest deletion state may be incremented to the next higher deletion state. If a read access is made to any of the data blocks, then those data blocks may be reset to the lowest deletion state. Any data block at the highest deletion state may be deleted from the read cache.

An embodiment of the disclosure may also comprise performing memory management for each of a plurality of storage devices that may each be assigned to an upper tier or a lower tier, where the plurality of storage device each comprises data blocks. Each of the data blocks may have a corresponding state. A processor may read the state of each of the data blocks and demote a data block to the lower tier if so indicated by the state of the data block, or delete a data block from a read cache if so indicated by the state of the data block.

There may be a plurality of demotion states, and the method may comprise counting a demotion period. When counting the demotion period is finished, each data block that is not at a highest demotion state may be incremented to the next higher demotion state. If a write access is made to any of the data blocks, then those data blocks may be reset to a lowest demotion state. Any data block at the highest demotion state may be demoted to the next lower tier.

There may be a plurality of deletion states, and the method may comprise counting a retention period. When counting the retention period is finished, each data block that is not at a highest deletion state may be incremented to the next higher deletion state. If a read access is made to any of the data blocks, then those data blocks may be reset to the lowest deletion state. Any data block at the highest deletion state may be deleted from the read cache.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
one or more processors operable to maintain a plurality of data blocks among a plurality of upper tier storage devices and a plurality of lower tier storage devices, wherein during the maintenance of the plurality of data blocks, the one or more processors are operable to:
set a deletion state of a data block to a lowest deletion state when the data block is accessed;
increment a deletion state of a data block to a next higher deletion state when:
a retention period is reached, and
the deletion state of the data block is not already at a highest deletion state; and
demote a data block to a lower tier storage device when:
the retention period is reached,
the data block is already at a highest deletion state, and
the data block is currently stored in an upper tier storage device.

2. The system of claim 1, wherein the one or more processors are operable to:
delete a data block of the lower tier when the data block is at the highest deletion state.

3. The system of claim 1, wherein the one or more processors are operable to:
delete a data block of the lower tier from a read cache when the data block is at the highest deletion state.

4. The system of claim 1, wherein the one or more processors are operable to:
reset a data block to a lowest deletion state if the data block is read.

5. The system of claim 1, wherein the each of the data blocks is a 4 kilobyte data block.

6. A system comprising:
one or more processors operable to maintain a plurality of data blocks among a plurality of upper tier storage devices and a plurality of lower tier storage devices, wherein during the maintenance of the plurality of data blocks, the one or more processors are operable to:

set a demotion state of a data block to a lowest demotion state when the data block is accessed;

increment a demotion state of a data block to a next higher demotion state when:

a retention period is reached, and the demotion state of the data block is not already at a highest demotion state; and demote a data block to a lower tier storage device when:

the retention period is reached, the data block is already at a highest demotion state, and the data block is currently stored in an upper tier storage device.

7. The system of claim 6, wherein the one or more processors are operable to:

delete a data block of the lower tier when the data block is at the highest demotion state.

8. The system of claim 6, wherein the one or more processors are operable to:

delete a data block of the lower tier from a read cache when the data block is at the highest demotion state.

9. The system of claim 6, wherein the one or more processors are operable to:

reset a data block to a lowest demotion state if the data block is written.

10. The system of claim 6, wherein the each of the data blocks is a 4 kilobyte data block.

11. A method comprising:

using one or more processors to maintain a plurality of data blocks among a plurality of upper tier storage devices and a plurality of lower tier storage devices, by:

setting a deletion state of a data block to a lowest deletion state when the data block is accessed;

incrementing a deletion state of a data block to a next higher deletion state when:

a retention period is reached, and the deletion state of the data block is not already at a highest deletion state; and demoting a data block to a lower tier storage device when:

the retention period is reached, the data block is already at a highest deletion state, and the data block is currently stored in an upper tier storage device.

12. The method of claim 11, wherein the method comprises:

deleting a data block of the lower tier when the data block is at the highest deletion state.

13. The method of claim 11, wherein the method comprises:

deleting a data block of the lower tier from a read cache when the data block is at the highest deletion state.

14. The method of claim 11, wherein the method comprises:

resetting a data block to a lowest deletion state if the data block is read.

15. The method of claim 11, wherein the each of the data blocks is a 4 kilobyte data block.

16. A method comprising:

using one or more processors operable to maintain a plurality of data blocks among a plurality of upper tier storage devices and a plurality of lower tier storage devices, by:

setting a demotion state of a data block to a lowest demotion state when the data block is accessed;

incrementing a demotion state of a data block to a next higher demotion state when:

a retention period is reached, and the demotion state of the data block is not already at a highest demotion state; and demote a data block to a lower tier storage device when:

the retention period is reached, the data block is already at a highest demotion state, and the data block is currently stored in an upper tier storage device.

17. The method of claim 16, wherein the method comprises:

deleting a data block of the lower tier when the data block is at the highest demotion state.

18. The method of claim 16, wherein the method comprises:

deleting a data block of the lower tier from a read cache when the data block is at the highest demotion state.

19. The method of claim 16, wherein the method comprises:

resetting a data block to a lowest demotion state if the data block is written.

20. The method of claim 16, wherein the each of the data blocks is a 4 kilobyte data block.

* * * * *